(12) United States Patent
Trigg

(10) Patent No.: US 12,251,044 B2
(45) Date of Patent: *Mar. 18, 2025

(54) BARBEQUE DEVICE TO PROLONG FUEL BURNING AND ITS METHOD OF USE

(71) Applicant: Laurence Edward Trigg, Santa Clara, CA (US)

(72) Inventor: Laurence Edward Trigg, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/533,659

(22) Filed: Dec. 8, 2023

(65) Prior Publication Data

US 2024/0099511 A1    Mar. 28, 2024

Related U.S. Application Data

(63) Continuation of application No. 17/027,742, filed on Sep. 22, 2020, now Pat. No. 11,871,872, which is a continuation of application No. 16/039,316, filed on Jul. 18, 2018, now Pat. No. 10,820,751.

(60) Provisional application No. 62/534,202, filed on Jul. 19, 2017.

(51) Int. Cl.
    *A47J 37/07*    (2006.01)

(52) U.S. Cl.
    CPC ....... *A47J 37/0704* (2013.01); *A47J 37/0786* (2013.01); *A47J 37/079* (2013.01)

(58) Field of Classification Search
    CPC ............................ A47J 37/0786; A47J 37/079
    See application file for complete search history.

(56) References Cited

U.S. PATENT DOCUMENTS

| | | | | |
|---|---|---|---|---|
| 3,112,716 A * | 12/1963 | Moore | ................... | A47J 37/079 126/168 |
| 4,592,334 A * | 6/1986 | Logan, Jr. | ........... | A47J 37/0786 126/25 B |
| 4,782,208 A * | 11/1988 | Withrow | ............ | B23K 26/0846 219/121.72 |
| 5,014,424 A * | 5/1991 | Takasugi | ............... | B21C 37/125 72/50 |
| 5,074,279 A * | 12/1991 | Sainsbury | ........... | A47J 37/0786 126/145 |
| 5,097,817 A * | 3/1992 | Dodgen | .............. | A47J 37/0704 126/25 R |
| 6,688,301 B1 * | 2/2004 | McNeill | .............. | A47J 37/0786 126/25 B |
| 8,365,717 B1 * | 2/2013 | Perry | ................... | A47J 37/0786 126/30 |
| 2004/0154606 A1 * | 8/2004 | McNeill | .............. | A47J 37/0786 126/25 R |
| 2006/0213136 A1 * | 9/2006 | Lin | ....................... | E04B 1/2604 52/295 |
| 2017/0095115 A1 * | 4/2017 | Hopkins | ................. | F24B 1/191 |
| 2018/0112883 A1 * | 4/2018 | Huang | .................... | F24C 15/28 |

* cited by examiner

*Primary Examiner* — Jorge A Pereiro
(74) *Attorney, Agent, or Firm* — DANE IP Law PC

(57) ABSTRACT

A barbecue device to prolong fuel burning comprising a plurality of vertical walls that are cut from an elongate strip such that they provide fuel containment and air openings without removing or discarding any material needed to provide said air openings for the fuel.

19 Claims, 4 Drawing Sheets

SECTION A-A

BARBEQUE DEVICE TO PROLONG FUEL BURNING AND ITS METHOD OF USE

CROSS-REFERENCE TO RELATED APPLICATIONS

This application is a continuation of U.S. application Ser. No. 17/027,742, filed 09-22-2020, which is a continuation of U.S. application Ser. No. 16/039,316, filed on 2018 Jul. 18, now U.S. patent Ser. No. 10/820,751, which relates to and claims the benefit of U.S. Provisional Application No. 62/534,202, filed on 2017 Jul. 19, the contents of which are expressly incorporated by reference herein.

BACKGROUND—PRIOR ART

The following is a tabulation of some prior art that presently appears relevant:

| U.S. Patents | | | |
|---|---|---|---|
| Pat. No. | Kind Code | Issue Date | Patentee |
| 7,032,587 | B2 | 2004 Feb. 4 | McNeill |
| 6,523,423 | B1 | 2003 Feb. 25 | Hogle |
| 4,592,334 | A | 1986 Jun. 3 | Logan |

Non-Patent Literature Documents

Goldwyn, M., Amazing Ribs.com, "The best setup and accessories for the Weber kettle and Other kettles" describing the SlowNSear device (January 2018)

Owens, "Vortex Indirect Heat for Kettle and Kamado Cookers" describing the Vortex device (August 2014))

This invention relates to devices for conventional solid fuel barbeques used for slow cooking or smoking. Slow cooking or smoking with solid fuel such as charcoal in barbeques can be labor intensive and difficult, due to the need to add additional charcoal for the long cooking times necessary to cook at the lower temperatures required. This is because most charcoal barbeques have no mechanism to burn the fuel slowly besides the air venting. Generally fuel is burned all at once in a pile, requiring additional fuel be added to prolong cooking times.

Various accessories have been created to prolong burning without adding additional fuel. These rely on arranging the fuel into a continuous path between walls inside conventional barbeques in order to force the fuel to burn from one end to the other in sequential fashion. Unfortunately, these walls must provide some form of ventilation in the form of physical spacers or perforations for the fuel to burn efficiently. The spacers add material cost and complexity and the ventilation is wasteful because the material that is removed for ventilation is discarded. Other devices create ventilation by making the walls from wire mesh, but this mesh must be welded or woven together to hold its shape and the termination of the wires must be sealed somehow to prevent cutting the user. This welding and sealing processes end up costing more per square inch than the aforementioned perforated sheet metal. Still other devices do not add features for ventilation besides the bottom grate they rest on, but doing so reduces the amount of ventilation available and also increases the amount of total material used to create the same height wall as the meshed walls described above.

The popularity of these slow burning accessories have only increased with the heightened use of natural lump charcoal. Unfortunately, natural lump charcoal requires even more airflow than charcoal in order burn completely. Lump charcoal also requires more air space in the continuous pathway burn method. So, barbeque manufacturers have long sought for ways to more economically provide ventilation and lower material cost, so as to be more competitive in the market.

U.S. Pat. No. 7,032,587 to McNeill provides a linear band that forms a path between it and the inside perimeter of the barbeque, but the bottom edge of the path restricts air flow requiring perforation to overcome the loss. Unfortunately, even more perforation is required with one iteration of the invention because the bottom edge of the band rests directly on the solid wall of the barbeque which basically shuts off all airflow from the bottom, where it is needed the most for combustion. McNeil's design also employs a multi wall embodiment that rests on the bottom of the charcoal grate thereby increasing airflow but the band still requires perforation or notches to be put into it for airflow and the multi wall version is more costly to produce than a single wall version. In addition, the additional walls push the burning fuel further toward the center cooking area, placing the lit fuel beneath the food thereby increasing the likelihood the food will be burned and not cooked slowly as desired.

U.S. Pat. No. 6,523,463 to Hogle Utilizes a linear band that rests on the charcoal grate to form a path between it and the inside perimeter of the barbeque. This path is filled with charcoal and burned from one end to the other sequentially in order to prolong burning. Unfortunately, the band has a straight bottom edge that restricts airflow to the coals, forcing the band to be perforated in order to allow enough airflow for consistent burning of the charcoal. Even more perforations would be needed to burn lump charcoal in such a device which would be more costly than a device that can provide the same, or more airflow without perforation.

U.S. Pat. No. 4,592,334 to Logan, Jr. utilizes a thick undulating ring shaped wire in order to have the strength to contain the charcoal, but this shape is meant to contain it in a single pile on the inside of the ring to facilitate faster ignition, rather than slower burning. Although a design such as this could be used to contain charcoal in a path on the outside of the ring like Hogle and McNeill, the increased mass of the thicker wire actually uses more material than a thin band and would draw more heat away from the charcoal, rendering it less effective at heating the food.

The SlowNSear device described by Goldwin uses a perforated bottom wall in order to provide ventilation for the charcoal. Since this perforated surface already rests on the ventilated charcoal grate, it is even more wasteful than the devices previously mentioned that provide ventilation with no bottom wall. It also uses an additional wall to contain the charcoal instead of using the existing wall of the barbecue which adds further cost compared to its competitors.

The Vortex, described in "Vortex Indirect Heat for Kettle and Kamado Cookers" uses an angled wall in the shape of a cone to contain the charcoal against the inside perimeter of a barbecue and the bottom grate of the barbeque to provide ventilation. In addition to the aforementioned problems associated with no wall ventilation, the angled cone wall uses more material to contain the charcoal than devices which employ a vertical cylindrical wall of the same diameter making it more expensive to produce. The angled wall also forces the stacked charcoal to burn at an angle which is less efficient than burning it vertically.

In conclusion, insofar as I am aware, no barbeque device to prolong solid fuel burning provides ventilation without the defect of adding otherwise unnecessary material or discarding material in creation of ventilation features.

SUMMARY

An improved barbeque device to prolong fuel burning and it's method of use in the shape of an elongated band that creates a path between it and the inside perimeter of a conventional barbeque. The band is created by cutting a curved or angular line pattern down the center of an elongated strip to create two or more walls with the protruding edge of one wall edge providing the open area of the other wall edge. The band is created by joining a single or plurality of the aforementioned walls end to end with the curved or angular pattern shape facing downward on a horizontal surface thereby creating negative space of the curve against the horizontal surface for airflow crucial to combustion. Since this airflow is created without removing material, but rather creating it from negative space of the adjacent wall, it creates the same band length and functional height with less material and effort than would be required by perforating holes or adding spacers in a single or multiple bands.

Still further advantages will become apparent from a study of the following description and drawings.

DRAWINGS—FIGURES

Figure 1:
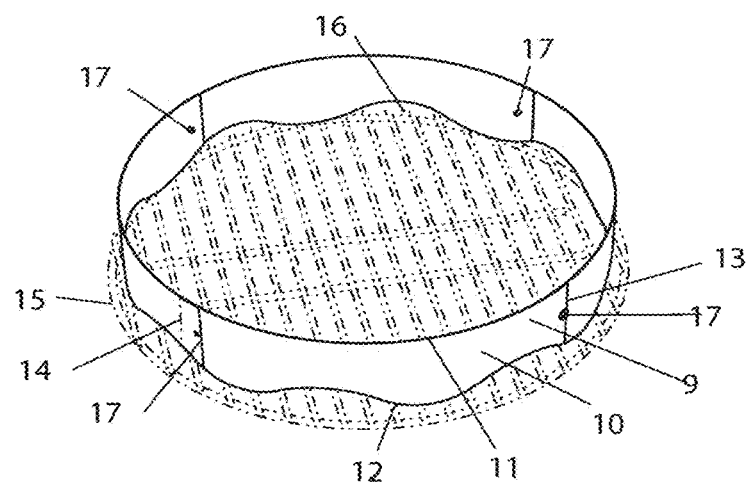
FIG. 1 is a perspective front view of the device to prolong fuel burning for outdoor cooking constructed in accordance with the invention, the horizontal surface is shown in phantom lines.

| Drawings - Reference Numerals | |
|---|---|
| 8. | conventional sold fuel barbeque |
| 9. | device to prolong fuel burning |
| 10. | wall |
| 11. | top edge |
| 12. | bottom edge |
| 13. | first end |
| 14. | second end |
| 15. | horizontal surface |
| 16. | opening |
| 17. | hole |
| 18. | elongated strip |
| 23. | rivets |
| 24. | screw |
| 25. | wingnut |
| 26. | charcoal briquettes |
| 27. | fire starting device |
| 28. | edge |
| 29. | edge |
| 30. | edge |
| 32. | starter cube |
| 33. | wall |
| 34. | wall |
| 35. | flange |
| 36. | lump charcoal |
| 37. | arrow |
| 38. | path |
| 39. | gap |
| 40. | arrow |
| 41. | arrow |
| 42. | volume |
| 43. | volume |
| 44. | openings |
| 45. | food |

DETAILED DESCRIPTION

Figure 5:
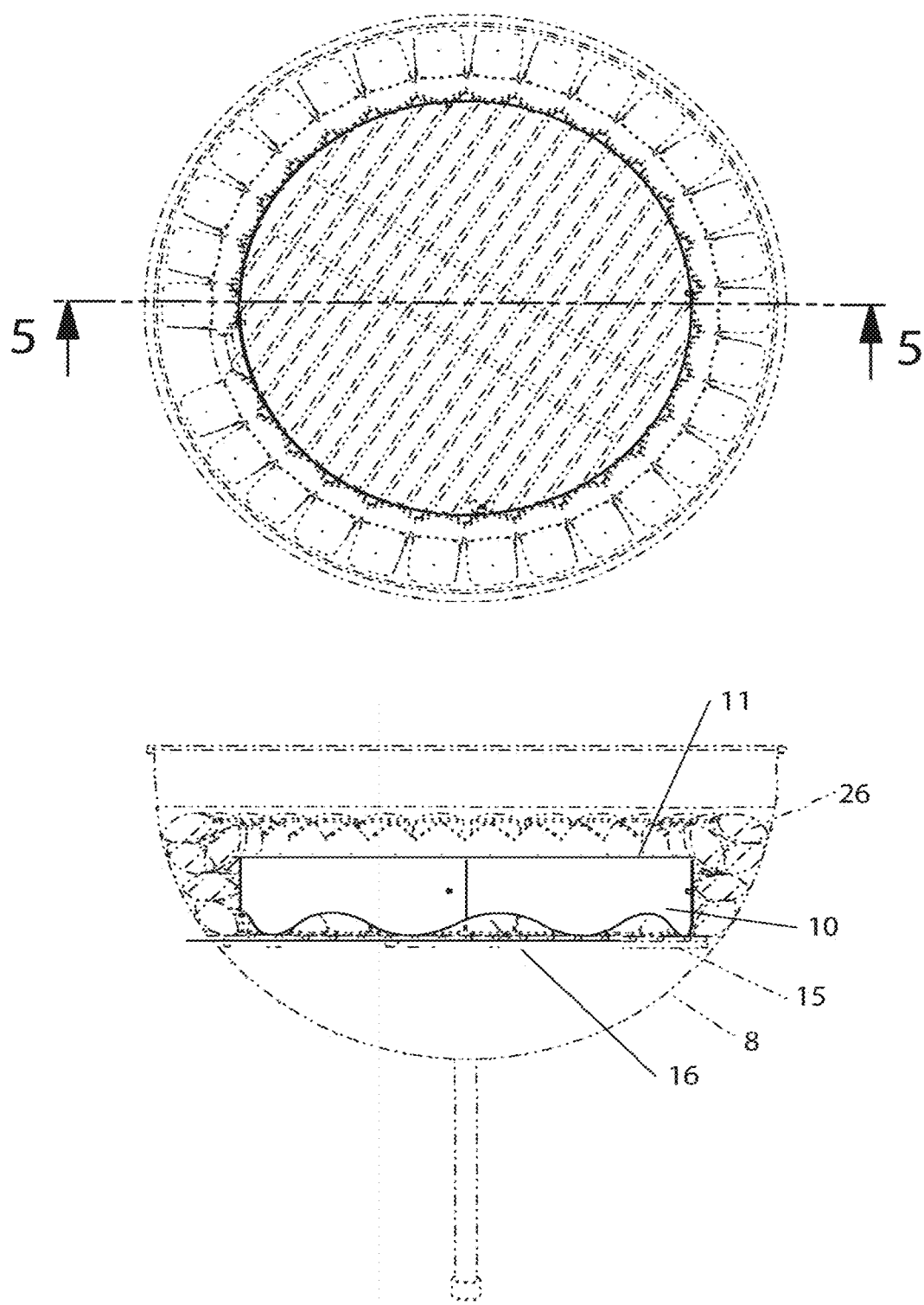
FIG. 5 is a front cross-sectional view of the device installed in a barbeque with the barbeque, charcoal and horizontal surface shown in phantom lines.

FIG. 1 is a front perspective view of a barbeque device to prolong fuel burning constructed in accordance with the invention. The device 9 is constructed as an elongate wall 10 having a top edge 11 and an opposite curved bottom edge 12, and opposite first 13 and second 14 ends extending perpendicular to edge 11. The bottom edge 12 touches the horizontal surface 15 of the barbeque at points where it is dimensioned such as to maximize the amount of openings 16 for optimal airflow. Preferably, the vertical height of wall 10 is about 3" above horizontal surface 15. A singular or a plurality of walls 10 are joined together at holes 17 to form a band shape that fits within the
cooking area of a conventional 18" or 22½" kettle style barbeque as shown in FIG. 5. Dimensions of the wall may be changed so that it will fit within the inside perimeter of other barbeques and smokers of various size.

Figure 2:
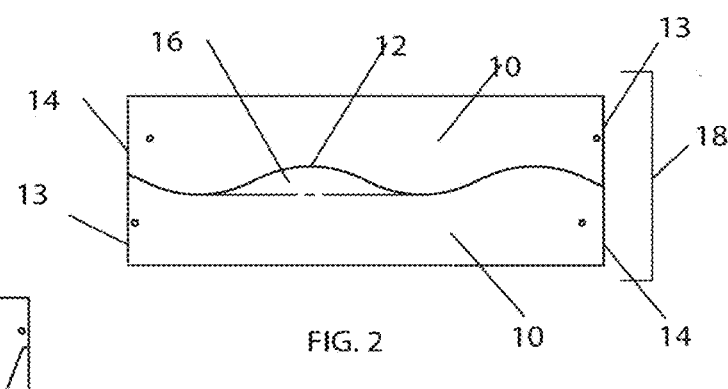
FIG. 2 is a front plan view of FIG. 1 in its flattened state showing two wall sections prior to being separated, with the two wall sections being formed by a curved line.

FIG. 2 is a front plan view of an elongated strip 18 of which this strip is cut lengthwise into two separate walls 10 by cutting a curve 12 down the middle of the strip. The strip may be constructed of sheet metal or other stiff, heat resistant material. The cutting may be done with die cutting or shearing tools that cut the metal with a shearing action so as to not remove or waste material in the cutting. In this way, openings 16 (only one shown and demarcated by a dashed line) are created in each strip when the strip is placed with the curved side down against a horizontal surface FIG. 1. These openings are thereby created without removing any material from elongated strip 18, resulting in a net saving of material that would otherwise be discarded by creating holes or notches conventionally via a punch or notcher. In this particular embodiment 12.5% material is saved as compared to creating the identical two walls 10 separately. The curved line 12 is dimensioned such that opposite ends 13 and 14 form a straight line making elongated strip 18 perimeter a rectangle. This rectangular shape may be repeated on a continuous roll of material and such as a coil of sheet metal and therefore eliminates any trim waste when cutting out elongated strip 18.

Figure 3:
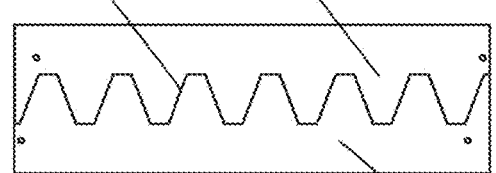
FIG. 3 is a front plan view of FIG. 9 in its flattened state showing two wall sections prior to being separated with the two wall sections being formed by an angular line.

FIG. 3 is a front plan view of the device of FIG. 2 where edge 12 is a geometric pattern created by straight lines instead of curves. In this particular embodiment 25% material is saved as compared to creating the identical two walls 10 without the center cut 12. Still more savings in material may be achieved by increasing the height of the angular pattern or aforementioned curved pattern.

Figure 4:
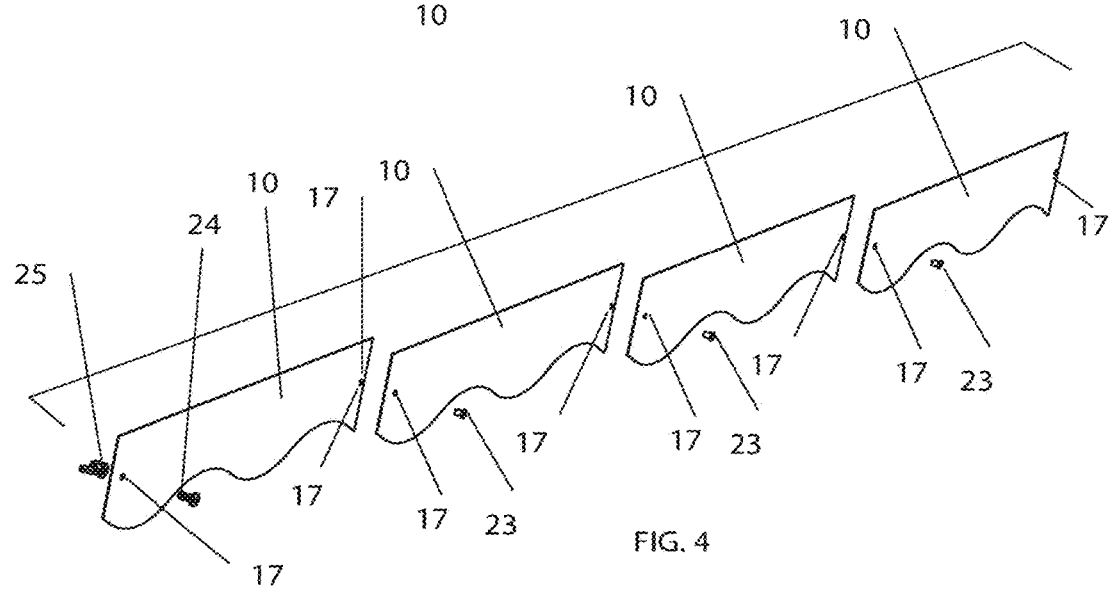
FIG. 4 is a perspective exploded view of FIG. 1 in its flattened state.

FIG. 4 is a perspective exploded view FIG. 1 shown in the unbent state. Walls 10 overlap at holes 17 to allow fasteners 23 to attach the walls together (in this configuration, rivets are used) to connect 4 wall sections to form a single strip, which are then bent to form a single wall while screw 24 and wingnut 25 are employed by the user to attach outermost ends 13 and 14 together after the single wall is bent by hand to form a band shape (FIG. 1). In this configuration, four identical sections are used to create a band of approximately 15⅞" in diameter FIG. 1. Other numbers of wall sections may be used, including a singular wall so as to reach the same 15⅞ diameter or they may be varied in length in order to make other diameters so as to fit within barbeques of various sizes.

FIG. 5 is a sectional view of the device of FIG. 1 showing solid fuel, in this case, charcoal briquettes 26 loaded adjacent to wall 10 within the inside perimeter of a conventional barbeque 8 and sitting on a horizontal surface 15. In this usage, the horizontal surface is the charcoal grate, but may be other items such as a horizontal wall or bracket. Top edge 11 is dimensioned to be below the stacked charcoal while still containing the charcoal. The short height keeps wall 10 from needing perforation in order to supply sufficient airflow to the burning charcoal. The short height of edge 11 in combination with openings 16 allow sufficient airflow to allow complete burning of the charcoal.

Figure 6:
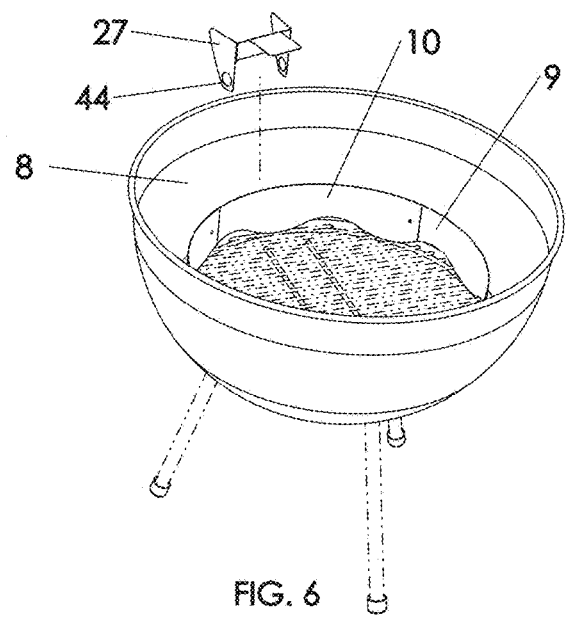
FIG. 6 is a perspective exploded view of a fire starting device shown above its correct position with the barbeque and horizontal surface shown in phantom lines.
Figure 8:
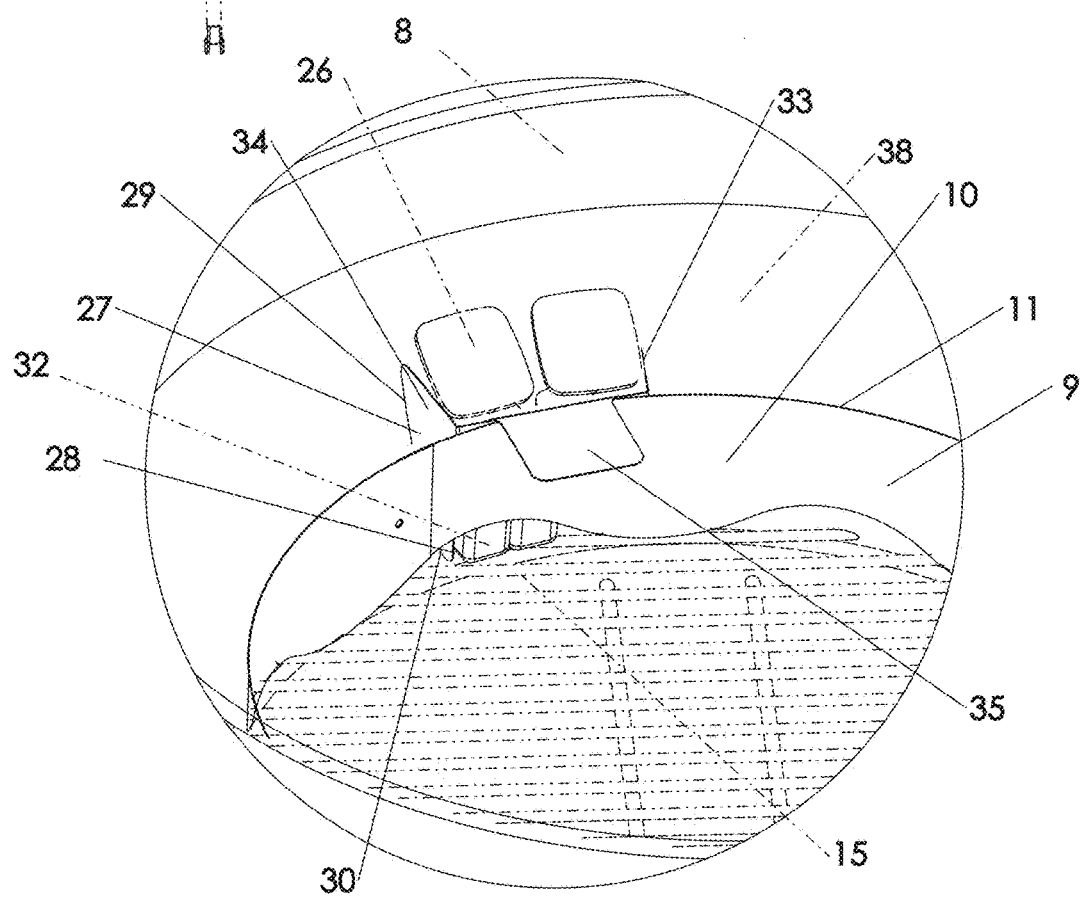
FIG. 8 is a perspective detail view of the fire starting device shown in position within the device of FIG. 6 with the barbeque, charcoal, and horizontal surface shown in phantom lines.

FIG. 6 is a perspective exploded view showing a starter device 27 above the device 9 of FIG. 1. In operation, the starter device is placed between wall 10 and the inside perimeter of a conventional barbeque 8. Openings 44 are dimensioned so as to maximize ignition of fuel within the starter device while also concentrating heat within the starter device to speed ignition of the fuel.

Figure 7:
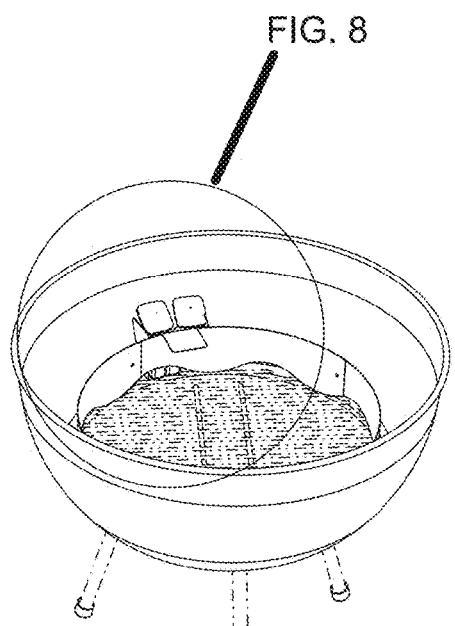
FIG. 7 is a perspective assembled view of the fire starting device shown in position within the device of FIG. 6 with the barbeque, charcoal, and horizontal surface shown in phantom lines.

FIG. 7 is a perspective detail view of starter device 27 in position between device 9 and the inside perimeter of barbeque 8. Edge 28 rests against the outside perimeter wall 10 and edge 29 rests against the inside perimeter of a conventional barbeque 8. Edge 30 rests against the top of horizontal surface 15. Spacing between edges 28 and 29 are dimensioned so that they create a path 38 of constant width so as to create a consistent heat when fuel is burned within the path. Starter cubes 32 rest between walls 33 and 34 and on top of horizontal surface 15. Solid fuel pieces 26 are placed atop starter cubes 32 such that they fill the void between the outside perimeter of wall 10 and the inside perimeter of the barbeque wall 8. Multiple openings 44 (FIG. 6) are dimensioned so as to maximize airflow for optimal combustion of the starter cubes and subsequently, the solid fuel pieces. Flange 35 rests on top of to edge 11 and serves as a handle for insertion and removal of the starter device. Construction of starter device 27 can be constructed of a flat pattern of sheet metal dimensioned of a thickness and strength such that it can be bent by hand by the user to the desired shape shown.

Figure 9:
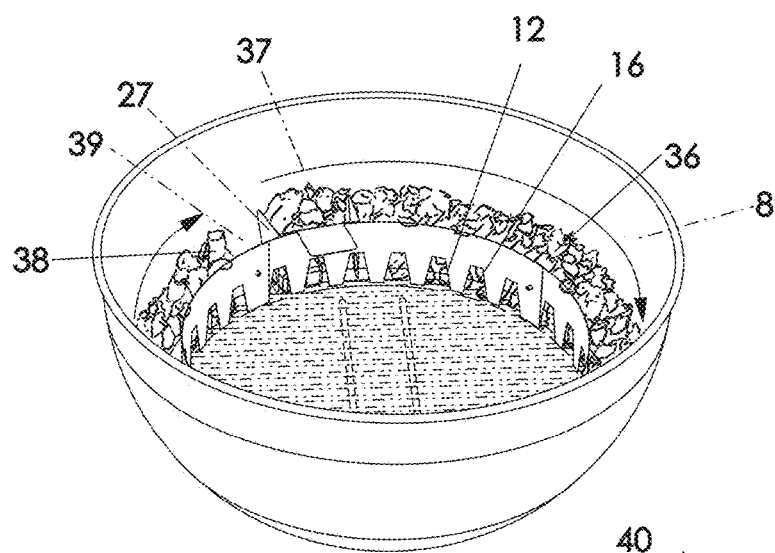
FIG. 9 is a front perspective view of the device to prolong fuel burning for outdoor cooking shown in an alternate configuration to burn lump charcoal with the barbeque, lump charcoal, starter cubes and horizontal surface shown in phantom lines.

FIG. 9 is a perspective view where edge 12 is a geometric pattern created by straight lines instead of curves. In this configuration, openings 16 are cut from the same elongated strip 18 (FIG. 3) but are cut in a deeper geometric pattern and at an increased pitch than curve 12 (FIG. 2) to allow more airflow necessary for the burning of lump charcoal 36. Arrow 37 shows the direction of burn from the starter device 27 clockwise to the end of the charcoal path 38. Gap 39 is left in the fuel so that the lighting of fuel in starter device 27 lights the solid fuel only in the single direction of arrow 37 and not in the opposite direction around the inside perimeter of barbeque 8.

Figure 10:
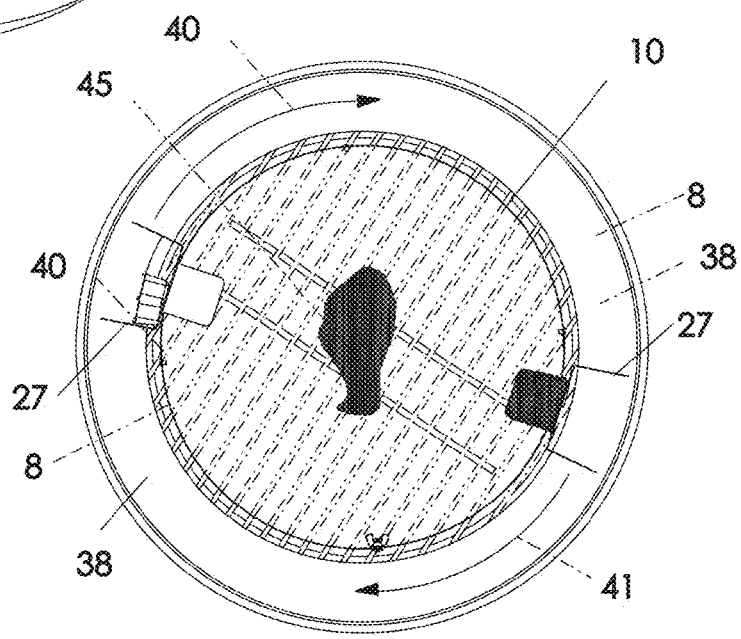
FIG. 10 is a top plan view of the device of FIG. 9 showing one method of fuel burning path direction in the barbecue with the barbeque, horizontal surface and food shown in phantom lines.

FIG. 10 is a top view of the device of FIG. 9 showing two starter devices 27 dimensioned so that they create an even path 38 between wall 10 and the inside perimeter of the barbeque 8. In this configuration, the starter devices are both lit in order to allow the fuel to burn on two opposing direction of the barbeque 8 at once in the direction of arrows 40 and 41. This allows two opposing heat sources to burn around the food for more even heat distribution around the food 45.

Figure 11:
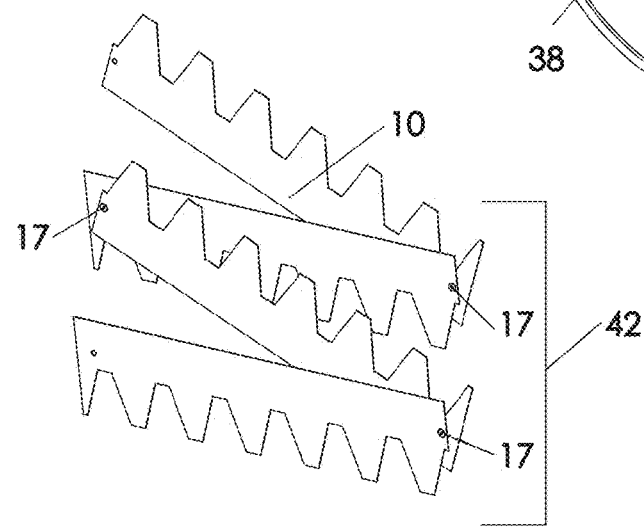
FIG. 11 is a perspective view of the device of FIG. 9 in its collapsed state.

FIG. 11 is a perspective view of the device of FIG. 9 in its flattened and folded state, showing how walls 10, when attached by fasteners 23 (in this configuration, rivets) can be rotated to create a flattened and smaller overall volume 42 for the purpose of lower volume shipping, storage, packaging and handling.

Figure 12:
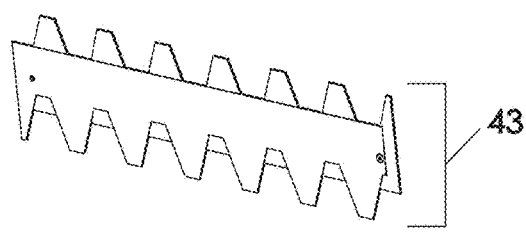
FIG. 12 is a perspective view of the device of FIG. 9 in its most fully collapsed state.

FIG. 12 is a perspective view of the device of FIG. 11 in its flattened and folded state showing the device rotated into a yet smaller overall volume 43 for the purpose of lower volume shipping, storage, packaging and handling.

Operation

In operation, the user unfolds the device FIG. 11 so that end 13 and 14 are in their furthest position away from each other FIG. 4 and then bends and attaches opposite ends using fasteners 24 and 25 to form a ring or band shape FIG. 1. The user then places ring with edge 12 downward on surface 15 of the barbeque 8 and then inserts one or more of the starting device 27 in between the inside perimeter of a barbeque and the outside perimeter of wall 10 FIG. 6 so as to create an even path for the fuel and to create a concentrated lighting area for the fuel. The user then places starter cubes 32 or other similar starting devices within walls 33 and 34 of the starter cube such that they rest on horizontal surface 15 DET 7. The user then adds solid fuel such as charcoal briquettes 26 or lump charcoal 36 on top of the starter cubes into device 27 and more solid fuel evenly around the fuel path 38 in the direction of arrow 37 FIG. 9. A space 39 is left at the end of fuel path 38 so as to disallow fuel from burning against the direction of arrow 37 FIG. 9. The starter cubes in device 27 are then lit. The heat of the flame is concentrated by action of openings 44 between wall 33 and wall 34 of the starter device such that it is ignited quickly. The starter device is then removed, if desired, with tongs or hot pads by grasping flange 35 DET 7. Openings 16 allow enough air along the bottom of device 9 such that ignition of adjacent fuel pieces are lit by convection and conduction in sequential action, thereby slowing the fuel from burning all at once yet staying lit due to the direction of air from low to high afforded by intermittent openings 16 along the bottom of edge 12 FIG. 5. These openings are created without discarding material allowing the aforementioned 12.5% and higher percentage saving of material during construction. The user may also use more than one starter device 27 to burn the fuel in multiple directions simultaneously around the food 45 for more even cooking.

Device 9 may be used without starting device 27 by igniting the aforementioned fuel at the beginning of arrow 37 with conventional means such as lighter fluid by leaving a gap 39 FIG. 9. Multiple gaps 39 and start points 37 may also be used without starter device 27 with the aforementioned conventional igniting technique to burn around the food 45 to achieve higher temperatures.

I claim:

1. A method for setting a temperature within a charcoal barbeque grill, the method comprising the steps of:
   providing a barbeque device for setting the temperature within the charcoal barbeque grill, the device comprising: the charcoal barbeque grill having a hollow body and a charcoal grate which fits within the body, the body defining an inner diameter at a location where the charcoal grate sits within the body;
   a cylindrical metallic barrier;
   a fire blocking barrier disposable between the cylindrical metallic barrier and the body, wherein the fire blocking barrier extends from the cylindrical metallic barrier to an inner surface of the charcoal barbeque grill and a bottom edge portion of the cylindrical metallic barrier to an upper edge portion of the cylindrical metallic barrier, a distal edge of each of the fire blocking barrier conforming to a shape of the inner surface of the charcoal barbeque grill for blocking burning charcoal located on one side of the fire blocking barrier from igniting charcoal located on an opposed side of the fire blocking barrier;
   a plurality of fuel paths disposable between the cylindrical metallic barrier and the charcoal barbeque grill and starting from opposed sides of the fire blocking barrier and extended in opposite directions;
   wherein the fire blocking barrier has first and second opposed side surfaces spaced apart from each other to prevent burning charcoal located adjacent to the first side surface from igniting charcoal located adjacent to the second side surface;
   disposing the cylindrical metallic barrier of the barbeque device within the hollow body of the charcoal barbeque grill;
   positioning the cylindrical metallic barrier of the barbeque device centrally within the hollow body;
   disposing the fire blocking barrier around the hollow body of the charcoal barbeque grill;
   disposing charcoal between the hollow body and the cylindrical metallic barrier adjacent to the first side surface and adjacent to the second side surface to form the plurality of fuel paths.

2. The method of claim 1 wherein the first and second fire blocking barriers are disposable on opposite sides from each other on the cylindrical metallic barrier, and the plurality of fuel paths are first and second fuel paths starting from the first and second fire blocking barriers and burn charcoal in the same direction.

3. The method of claim 1 wherein the plurality of fire blocking barriers is two or more fire blocking barriers which are spaced apart from each other on the cylindrical metallic barrier, and the plurality of fuel paths is a corresponding number of fuel paths starting from the two or more fire blocking barriers and extending in the same direction.

4. The method of claim 1 further comprising a step of igniting charcoal all on a clockwise side or all on a counterclockwise side to each one of the plurality of fire blocking barriers.

5. The method of claim 4 wherein the igniting step comprises igniting charcoal on the side of each of the fire blocking barriers.

6. The method of claim 5 wherein the igniting step comprises igniting charcoal on the same side of each of the fire blocking barriers for burning all of the plurality of fuel paths in the same direction.

7. The method of claim 6 wherein the igniting step comprises igniting charcoal on the same side of each of the fire blocking barriers for burning all of the plurality of fuel paths in a clockwise direction.

8. The method of claim 1 wherein the disposing the plurality of fire blocking barriers step comprising disposing the plurality of fire blocking barriers equidistantly around the hollow body of the charcoal barbeque grill.

9. The method of claim 1 wherein the disposing the plurality of fire blocking barriers step comprises disposing the plurality of fire blocking barriers on opposed sides of the hollow body of the charcoal barbeque grill.

10. The method of claim 1 wherein the cylindrical metallic barrier has air vents formed in a lower portion of the cylindrical metallic barrier.

11. A method for setting a temperature within a charcoal barbeque grill, the method comprising the steps of:
    providing a barbeque device for setting the temperature within the charcoal barbeque grill, the device comprising: the charcoal barbeque grill having a hollow body and a charcoal grate which fits within the body, the body defining an inner diameter at a location where the charcoal grate sits within the body;
    a cylindrical metallic barrier;
    first and second fire blocking barriers disposable between the cylindrical metallic barrier and the body, the first and second fire blocking barriers disposable at a distance from each other on the cylindrical metallic barrier;
    first and second fuel paths disposable between the cylindrical metallic barrier and the charcoal barbeque grill and starting from each of the first and second fire blocking barriers;
    wherein each of the plurality of fire blocking barriers has first and second opposed side surfaces spaced apart from each other;
    disposing the cylindrical metallic barrier of the barbeque device within the hollow body of the charcoal barbeque grill;
    positioning the cylindrical metallic barrier of the barbeque device centrally within the hollow body;
    disposing the first and second fire blocking barriers at the distance around the hollow body of the charcoal barbeque grill;
    disposing charcoal between the hollow body and the cylindrical metallic barrier to form the first and second fuel paths;
    igniting charcoal at only the first side of each of the fire blocking barriers;
    preventing charcoal on the opposed second side of each of the fire blocking barriers from burning due to igniting charcoal on the first side with the fire blocking barriers so that the charcoal burns only in one direction.

12. The method of claim 11 wherein the first and second fire blocking barriers are disposable on opposite sides from each other on the cylindrical metallic barrier, and the plurality of fuel paths are first and second fuel paths starting from the first and second fire blocking barriers and burn charcoal in the same direction.

13. The method of claim 11 wherein the plurality of fire blocking barriers is two or more fire blocking barriers which are spaced apart from each other on the cylindrical metallic barrier, and the plurality of fuel paths is a corresponding number of fuel paths starting from the two or more fire blocking barriers and extending in the same direction.

14. The method of claim 11 further comprising a step of igniting charcoal all on a clockwise side or all on a counterclockwise side to each one of the plurality of fire blocking barriers.

15. The method of claim 14 wherein the igniting step comprises igniting charcoal on the side of each of the fire blocking barriers.

16. The method of claim 15 wherein the igniting step comprises igniting charcoal on the same side of each of the fire blocking barriers for burning all of the plurality of fuel paths in the same direction.

17. The method of claim 16 wherein the igniting step comprises igniting charcoal on the same side of each of the fire blocking barriers for burning all of the plurality of fuel paths in a clockwise direction.

18. The method of claim 11 wherein the disposing the plurality of fire blocking barriers step comprising disposing the plurality of fire blocking barriers equidistantly around the hollow body of the charcoal barbeque grill.

19. The method of claim 11 wherein the disposing the plurality of fire blocking barriers step comprises disposing the plurality of fire blocking barriers on opposed sides of the hollow body of the charcoal barbeque grill.

\* \* \* \* \*